US012354621B2

(12) United States Patent
Des Jardins

(10) Patent No.: US 12,354,621 B2
(45) Date of Patent: *Jul. 8, 2025

(54) REMOVAL OF AUDIO NOISE

(71) Applicant: Comcast Cable Communications, LLC, Philadelphia, PA (US)

(72) Inventor: George Thomas Des Jardins, Washington, DC (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/483,129

(22) Filed: Oct. 9, 2023

(65) Prior Publication Data

US 2024/0304207 A1 Sep. 12, 2024

Related U.S. Application Data

(63) Continuation of application No. 17/343,433, filed on Jun. 9, 2021, now Pat. No. 11,823,700, which is a continuation of application No. 16/905,239, filed on Jun. 18, 2020, now Pat. No. 11,062,724, which is a continuation of application No. 16/437,737, filed on Jun. 11, 2019, now Pat. No. 10,726,862, which is a continuation of application No. 15/679,761, filed on Aug. 17, 2017, now Pat. No. 10,360,924, which is a continuation of application No. 15/175,105, filed on Jun. 7, 2016, now Pat. No. 9,767,820, which is a
(Continued)

(51) Int. Cl.

| | |
|---|---|
| ***G10L 21/0308*** | (2013.01) |
| ***G10L 19/018*** | (2013.01) |
| ***G10L 21/0208*** | (2013.01) |
| ***G10L 21/0224*** | (2013.01) |
| ***G10L 25/84*** | (2013.01) |

(52) U.S. Cl.
CPC ........ *G10L 21/0308* (2013.01); *G10L 19/018* (2013.01); *G10L 21/0208* (2013.01); *G10L 21/0224* (2013.01); *G10L 25/84* (2013.01)

(58) Field of Classification Search
None
See application file for complete search history.

(56) References Cited

U.S. PATENT DOCUMENTS

| | | | |
|---|---|---|---|
| 5,848,163 | A | 12/1998 | Gopalakrishnan et al. |
| 6,535,617 | B1 | 3/2003 | Hannigan et al. |

(Continued)

FOREIGN PATENT DOCUMENTS

| | | | |
|---|---|---|---|
| EP | 0788089 | A2 | 8/1997 |
| EP | 1278183 | A1 | 1/2003 |
| WO | 2009056824 | A1 | 5/2009 |

OTHER PUBLICATIONS

Hollister, "ABC app eavesdrops on your TV to synchronize interactive content using Nielsen tech (video)," Engadget, www.engadget.com/2010/09/18/abc-app-eavesdrops-on-your-tv-to-synchronize-interactive-content/, Sep. 18, 2010, pp. 1-6.

(Continued)

*Primary Examiner* — Shaun Roberts
(74) *Attorney, Agent, or Firm* — Banner & Witcoff, Ltd.

(57) ABSTRACT

A system for removing noise from an audio signal is described. For example, noise caused by content playing in the background during a voice command or phone call may be removed from the audio signal representing the voice
(Continued)

command or phone call. By removing noise, the signal to noise ratio of the audio signal may be improved.

39 Claims, 11 Drawing Sheets

Related U.S. Application Data continuation of application No. 13/797,370, filed on Mar. 12, 2013, now Pat. No. 9,384,754.

(56) References Cited

U.S. PATENT DOCUMENTS

| | | | |
|---|---|---|---|
| 2002/0027994 | A1 | 3/2002 | Katayama et al. |
| 2005/0071159 | A1 | 3/2005 | Boman et al. |
| 2008/0118082 | A1 | 5/2008 | Seltzer et al. |
| 2010/0280641 | A1 | 11/2010 | Harkness et al. |
| 2012/0214515 | A1 | 8/2012 | Davis et al. |
| 2012/0317240 | A1 | 12/2012 | Wang |
| 2013/0058496 | A1 | 3/2013 | Harris |

OTHER PUBLICATIONS

"Cross-Correlation", Wikipedia, en.wikipedia.org/wiki/Cross-correlation, printed Oct. 4, 2012, pp. 1-5.

Nielsen Media-Sync, "How it Works," web.archive.org/web/20120419101045/http://media-sync.tv/howitworks, TVAura Mobile, LLC, Apr. 19, 2012, printed Mar. 12, 2013, pp. 1-2.

Gorham, "Nielsen and ABC's Innovative iPad App Connects New "Generation" of Viewers," nielsonwire, blog. nielsen.com/.../nielsen-and-abcs-innovative-ipad-app-connects-new-generation-of-viewers/, Sep. 16, 2010, pp. 1-4.

Weil, "Synchronized Second-Screen technologies panorama," blog. eltrovemo.com/529/synchronized-second-screen-technologies-panorama/, Nov. 15, 2011, pp. 1-12.

"Synchronizing Two Audio Tracks," dsp.stackexchange.com/questions/1418/synchronizing-two-audio-tracks, printed Oct. 4, 2012, pp. 1-2.

Extended European Search Report—EP 14159149.5—Dated Sep. 4, 2015.

May 4, 2017—European Office Action—EP 14159149.5.

Mar. 22, 2018—European Office Action—EP 14159149.5.

Jan. 29, 2020—Canadian Office Action—CA 2,845,088.

May 4, 2022—Canadian Office Action—CA 2,845,088.

REMOVAL OF AUDIO NOISE

CROSS-REFERENCE TO RELATED APPLICATIONS

This application is a continuation of U.S. application Ser. No. 17/343,433 filed Jun. 9, 2021, which is a continuation of U.S. application Ser. No. 16/905,239, filed Jun. 18, 2020 (now U.S. Pat. No. 11,062,724), which is a continuation of U.S. application Ser. No. 16/437,737, filed Jun. 11, 2019 (now U.S. Pat. No. 10,726,862), which is a continuation of U.S. application Ser. No. 15/679,761 filed Aug. 17, 2017 (now U.S. Pat. No. 10,360,924), which is a continuation of U.S. application Ser. No. 15/175,105 filed Jun. 7, 2016 (now U.S. Pat. No. 9,767,820), which is a continuation of U.S. application Ser. No. 13/797,370 filed Mar. 12, 2013 (now U.S. Pat. No. 9,384,754), each of which is hereby incorporated by reference in its entirety.

BACKGROUND

Audio signals may include both desired components, such as a user's voice, and undesired components, such as noise. Noise removal (or cancellation) attempts to remove the undesired components from the audio signals. One implementation of noise removal is dual microphone noise cancellation, where a first microphone is used to pick up primarily a desired signal (e.g., the user's voice) and a second microphone is used to pick up primarily an undesired signal (e.g., a noise signal, such as background noise). The dual microphone cancellation system may remove noise by subtracting the audio signal picked up by the second microphone from the audio signal picked up by the first microphone. This and other noise cancellation techniques have various drawbacks. For example, this noise cancellation technique does not perform well if the geometry of the audio source versus the noise source is not fixed or known. These and other drawbacks are addressed in this disclosure.

SUMMARY

This summary is not intended to identify critical or essential features of the disclosures herein, but instead merely summarizes certain features and variations thereof. Other details and features will also be described in the sections that follow.

Some of the various features described herein relate to a system and method for removing an audio noise component from a received audio signal. For example, a speech recognition system may attempt to decipher a user's voice command while a television in the background is on. The method may comprise receiving (e.g., for analysis) an audio signal having noise. The noise may correspond to a piece of content previously or currently being provided to a user. The method may further comprise identifying noise by identifying the piece (e.g., an item) of content provided to the user. In response to identifying the item of content, for example, an audio component of the item of content may be identified and/or received. The audio component may have been provided to the user while the audio signal having noise was generated. The method may include synchronizing the audio component of the item of content to the received audio signal. In some aspects, the synchronization may include identifying a first audio position mark (e.g., watermark) in the audio component of the item of content provided to the user, identifying a second audio position mark in the received audio signal, and matching the first audio position mark in the audio component to the second audio position mark in the received audio signal. The method may also include determining a first timestamp included in the first audio position mark and a second timestamp included in the second audio position mark, wherein matching the first audio position mark to the second audio position mark may include matching the first timestamp to the second timestamp. The audio component of the item of content may also be synchronized to the received audio signal based on a cross-correlation between the two signals. After the synchronization and further processing, the audio component of the item of content may be identified as noise and removed from the received audio signal.

In some aspects, the noise may be time-shifted from the audio component of the piece of content because the noise and audio component may be received separately and/or from different sources, and synchronizing the audio component of the piece of content to the received audio signal may include removing the time-shift between the audio component and the noise. The method may further include determining the magnitude of the noise, adjusting the magnitude of the audio component based on the magnitude of the noise, and subtracting the audio component having the adjusted magnitude from the received audio signal. In additional aspects, the piece of content may be a television program, and the audio signal may include a voice command.

A method described herein may comprise receiving an audio signal, extracting an audio watermark from the audio signal, identifying an audio component of a piece of content based on the audio watermark, and removing the audio component of the piece of content from the received audio signal. The method may further comprise extracting a second audio watermark from the audio component of the piece of content and synchronizing the audio component of the piece of content to the audio signal based on the audio watermark and the second audio watermark. Removing the audio component of the piece of content from the received audio signal may include subtracting the synchronized audio component of the piece of content from the received audio signal.

Identifying the audio component of the piece of content may include extracting an identifier identifying the piece of content from the audio watermark. The audio signal may include a voice command, and the method may further comprise forwarding, to a voice command processor, the audio signal having the audio component of the piece of content removed, wherein the voice command processor may be configured to determine an action to take based on the voice command. Additionally or alternatively, the audio signal may include a portion of a telephone conversation, and the method may further comprise forwarding, to at least one party of the telephone conversation, the audio signal having the audio component of the piece of content removed.

A method describe herein may comprise delivering a piece of content to a user, receiving, from the user, a voice command having noise, identifying an audio component of the piece of content delivered to the user, synchronizing the audio component of the piece of content to the received voice command, and/or removing the audio component of the piece of content from the received voice command based on the synchronization. In some aspects, synchronizing the audio component of the piece of content to the received voice command may include identifying a first audio watermark in the audio component of the piece of content, identifying a second audio watermark in the received voice command, and matching the first audio watermark to the second audio watermark. The method may also include determining a first timestamp included in the first audio watermark and a second timestamp included in the second audio watermark, wherein matching the first audio watermark to the second audio watermark may include matching the first timestamp to the second timestamp.

In some aspects, the noise included in the received voice command may comprise a second audio component corresponding to the audio component of the piece of content. The second audio component may be time-shifted from the audio component of the piece of content. Furthermore, synchronizing the audio component of the piece of content to the received voice command may comprise removing the time-shift between the audio component and the second audio component. Next, the magnitude of the second audio component may be determined and used to adjust the magnitude of the audio component. Further, the audio component having the adjusted magnitude may be subtracted or removed from the received voice command. In some aspects, the piece of content removed from the received voice command may correspond to a television program. The method may further comprise determining whether a user device scheduled to play the piece of content is on, and in response to determining that the user device is on, performing the audio component removal step.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
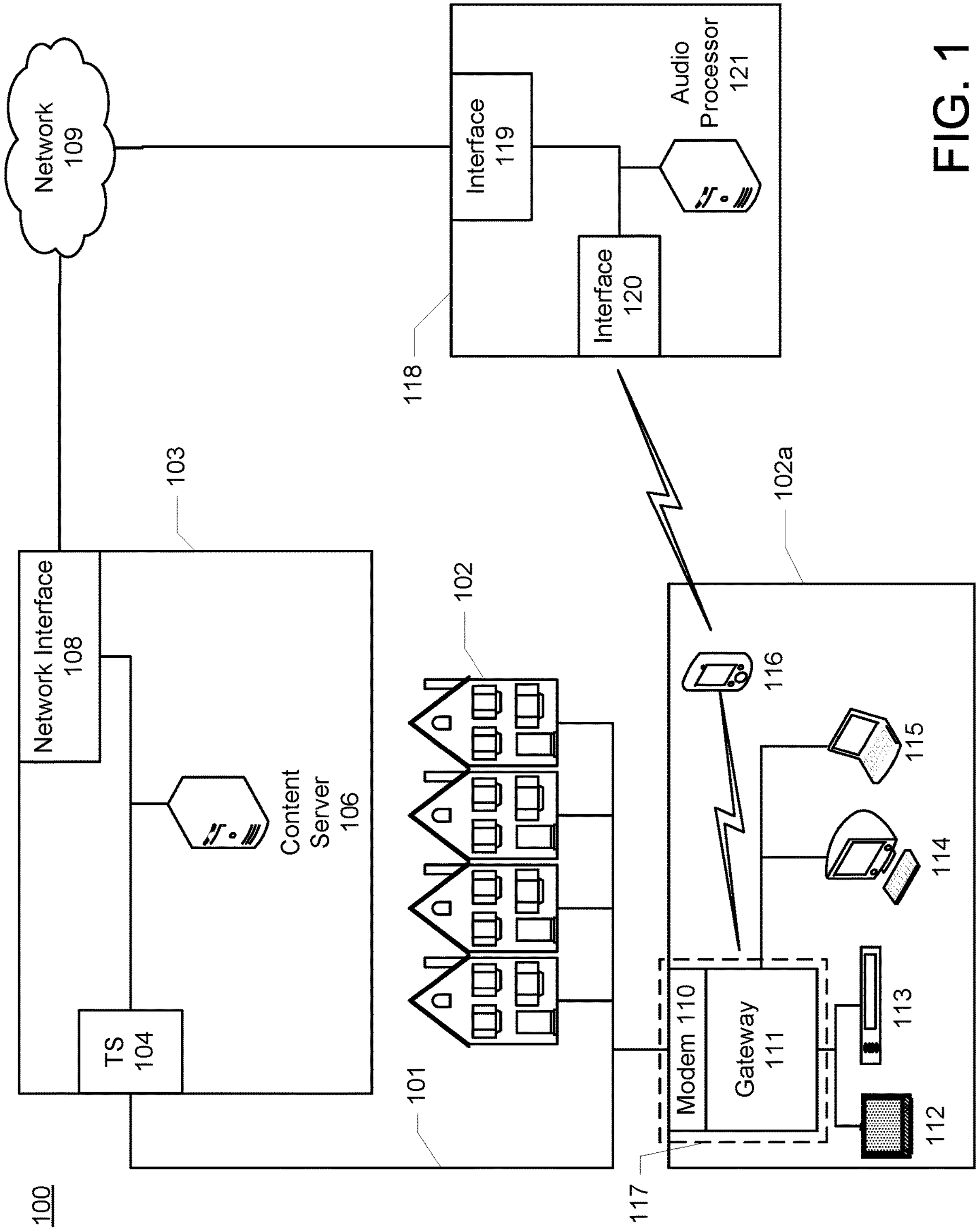
FIG. 1 illustrates an example information access and distribution network.

FIG. 1 illustrates an example information access and distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax (HFC) distribution network. Such networks 100 use a series of interconnected communication links 101 (e.g., coaxial cables, optical fibers, wireless connections, etc.) to connect multiple premises, such as homes 102, to a local office (e.g., a central office or headend 103). A local office 103 may transmit downstream information signals onto the links 101, and each home 102 may have devices used to receive and process those signals.

There may be one link 101 originating from the local office 103, and it may be split a number of times to distribute the signal to various homes 102 in the vicinity (which may be many miles) of the local office 103. Although the term home is used by way of example, locations 102 may be any type of user premises, such as businesses, institutions, etc. The links 101 may include components not illustrated, such as splitters, filters, amplifiers, etc. to help convey the signal clearly. Portions of the links 101 may also be implemented with fiber-optic cable, while other portions may be implemented with coaxial cable, other links, or wireless communication paths.

The local office 103 may include an interface 104, which may be a termination system (TS), such as a cable modem termination system (CMTS), which may be a computing device configured to manage communications between devices on the network of links 101 and backend devices such as server 106 (to be discussed further below). The interface may be as specified in a standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The interface may be configured to place data on one or more downstream channels or frequencies to be received by devices, such as modems at the various homes 102, and to receive upstream communications from those modems on one or more upstream frequencies. The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the local office 103 may include a variety of servers that may be configured to perform various functions. For example, the local office 103 may include a data server 106. The data server 106 may comprise one or more computing devices that are configured to provide data (e.g., content) to users in the homes. This data may be, for example, video on demand movies, television programs, songs, text listings, etc. The data server 106 may include software to validate user identities and entitlements, locate and retrieve requested data, encrypt the data, and initiate delivery (e.g., streaming) of the data to the requesting user and/or device.

An example home 102*a* may include an interface 117. The interface may comprise a device 110, such as a modem, which may include transmitters and receivers used to communicate on the links 101 and with the local office 103. The device 110 may comprise, for example, a coaxial cable modem (for coaxial cable links 101), a fiber interface node (for fiber optic links 101), or any other desired modem device. The device 110 may be connected to, or be a part of, a gateway interface device 111. The gateway interface device 111 may be a computing device that communicates with the device 110 to allow one or more other devices in the home to communicate with the local office 103 and other devices beyond the local office. The gateway 111 may comprise a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Wireless device 116 may also be a remote control, such as a remote control configured to control other devices at the home 102*a*. For example, the remote control may be capable of commanding the television 112 and/or STB 113 to switch channels. As will be described in further detail in the examples below, a remote control 116 may include speech recognition services that facilitate audio commands (e.g., a command to switch to a particular program and/or channel) made by a user. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

The local office 103 and/or devices in the home 102*a* (e.g., a wireless device 116, such as a mobile phone or remote control device) may communicate with an audio computing device 118 via one or more interfaces 119 and 120. The interfaces 119 and 120 may include transmitters and receivers used to communicate via wire or wirelessly with local office 103 and/or devices in the home using any of the networks previously described (e.g., cellular network, optical fiber network, copper wire network, etc.). Audio computing device 118 may have a variety of servers and/or processors, such as audio processor 121, that may be configured to perform various functions. As will be described in further detail in the examples below, audio processor 121 may be configured to receive audio signals from a user device (e.g., a mobile phone 116), to receive an audio component of a piece of content being consumed by a user at the user's home 102*a*, and/or to remove the audio component of the piece of content from the received audio signal.

Audio computing device 118, as illustrated, may be one or more component within a cloud computing environment. Additionally or alternatively, computing device 118 may be located at local office 103. For example, device 118 may comprise one or more servers in addition to server 106 and/or be integrated within server 106. Device 118 may also be wholly or partially integrated within a user device, such as a device within a user's home 102*a*. For example, device 118 may include various hardware and/or software components integrated within a TV 112, an STB 113, a personal computer 114, a laptop computer 115, a wireless device 116, such as a user's mobile phone or remote control, an interface 117, and/or any other user device.

Figure 2:
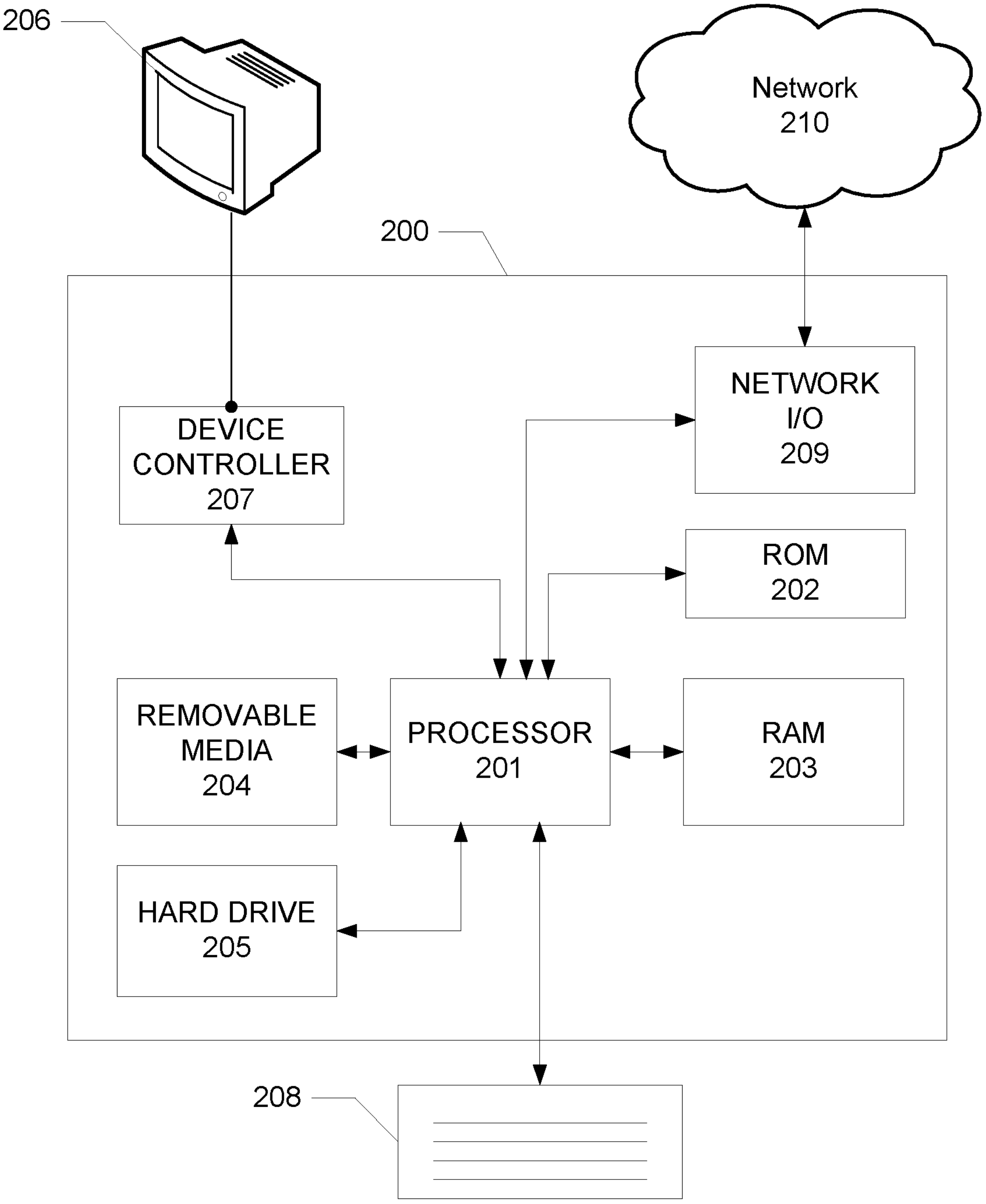
FIG. 2 illustrates an example hardware and software platform on which various elements described herein can be implemented.

FIG. 2 illustrates general hardware elements that can be used to implement any of the various computing devices discussed herein. The computing device 200 may include one or more processors 201, which may execute instructions of a computer program to perform any of the functions or steps described herein. The instructions may be stored in any type of computer-readable medium or memory, to configure the operation of the processor 201. For example, instructions may be stored in a read-only memory (ROM) 202, random access memory (RAM) 203, hard drive, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication links 101 discussed above, the external network 109, an in-home network, a provider's wireless, coaxial, fiber, or hybrid fiber/coaxial distribution system (e.g., a DOCSIS network), or any other desired network.

Figure 3:
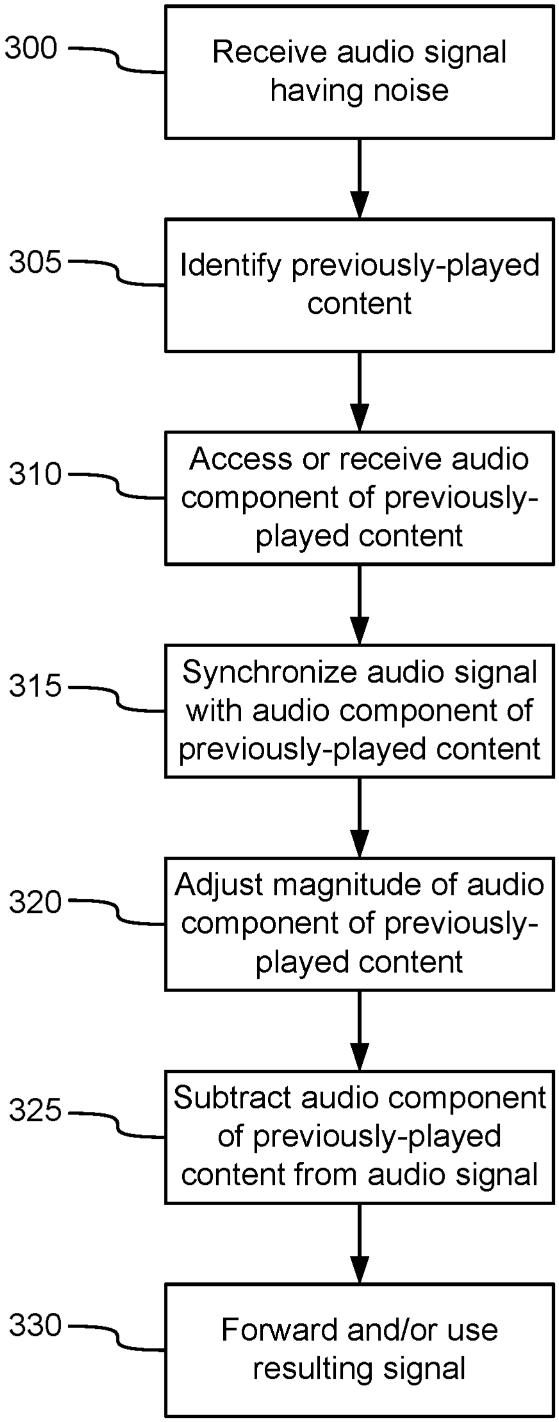
FIG. 3 illustrates an example method of removing noise from an audio signal.

Content playing in the background while a user issues a voice command or conducts a phone call may contribute unwanted noise to the voice command or phone call. By removing the content playing in the background (which may be noise), a signal to noise ratio of an audio signal generated by the voice command or phone call may be improved. FIG. 3 illustrates an example method of removing noise from an audio signal according to one or more illustrative aspects of the disclosure. The steps illustrated may be performed by a computing device, such as audio computing device 118 illustrated in FIG. 1. FIG. 3 provides a summary of concepts described herein, and additional details regarding the steps illustrated in FIG. 3 will be described in further detail in the examples below.

In step 300, a computing device may receive an audio signal, such as an audio message signal (e.g., from a remote control having a voice recognition service, a set top box, a smartphone, etc.). As previously discussed, the computing device that receives the audio signal may be located at any number of locations, including within a cloud computing environment, at local office 103, in a user device, and/or a combination of any of these locations. The audio signal (e.g., a message) may include a desired signal, such as a voice command, and undesired signals, such as an audio component of content playing in the background (which may be considered noise). In at least some embodiments, these signals may be simultaneously received at a single (or several) microphone or other sensor devices. In step 305, the computing device may identify content previously or currently being presented (e.g., viewed or played) by one or more devices within the home 102*a* (e.g., played within a predetermined time period, such as the length of the received audio signal, the last five seconds of all content played, or prior to the time it took to receive and analyze the audio signal). In step 310, the computing device may receive audio components of the content identified in step 305, which may have been previously-played or are currently playing on a user device or at a user home (e.g., audio components of audiovisual content). For example, if the computing device determined that television 112 was playing Television Show 1 while the user was speaking a voice command, the computing device may retrieve a recently-played audio component of Television Show 1 in step 310 to account for, for example, the volume of noise sources.

In step 315, the computing device may synchronize the audio signal with the received audio component of the previously-played content. For example, the computing device may match watermarks, or any other marker associated with time or location, present in the audio signal with corresponding watermarks in the audio component. Alternatively, the audio component and audio signal may be synchronized based on a cross-correlation between the two signals. In step 320, the computing device may optionally adjust the magnitude of the audio component to correspond to the magnitude of the noise signals present in the voice command. In step 325, the computing device may remove (e.g., isolate, subtract, etc.) the audio component of the playing content from the received audio signal (e.g., a voice command), thereby removing undesired noise signals from the audio signal. In step 330, the computing device may use and/or otherwise forward the resulting audio signal for further processing. For example, the computing device may process the audio signal to determine a voice command issued by a user (e.g., a voice command to switch channels).

Figure 4:
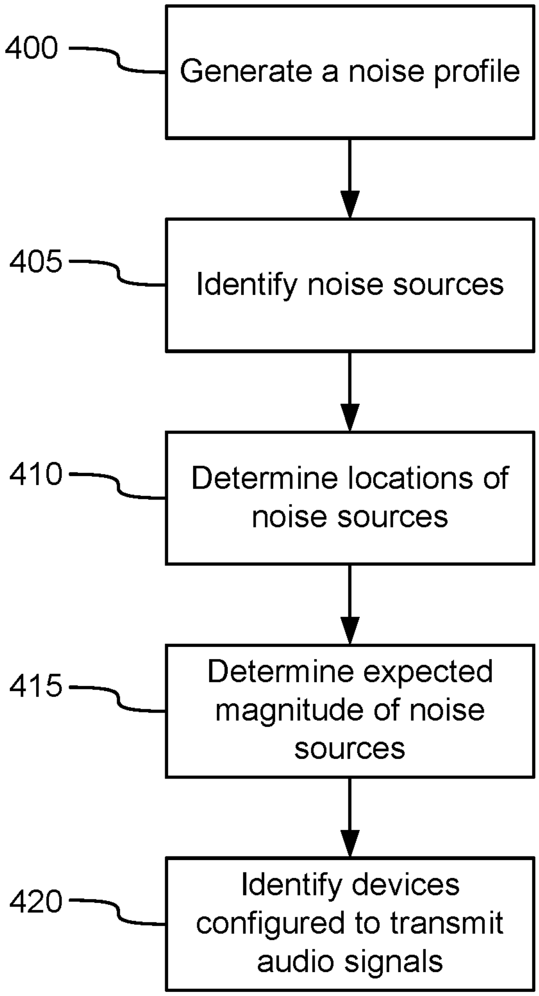
FIG. 4 illustrates an example method of implementing a noise removal system or device.

FIG. 4 illustrates an example method of implementing a noise removal system or device according to one or more illustrative aspects of the disclosure. The steps illustrated may be performed by a computing device, such as audio computing device 118 illustrated in FIG. 1. In step 400, the computing device may generate a noise profile for the user. The noise profile may store various pieces of information identifying noise sources and/or characteristics of noise signals resulting from the noise sources, as will be described in further detail in the examples below.

In step 405, the computing device may identify potential noise sources. As described herein, noise may include the audio components of content generated by various devices (e.g., noise sources) that play the content (or otherwise provide the content to users). Noise sources may include various devices at the user's home 102*a*, such as television 112, STB 113, computer 114, laptop 115, mobile device 116, and/or other client premises equipment, and also appliances such as refrigerators, washing machines, alarms, street noise, etc. Content that may contribute noise may include linear content (e.g., broadcast content or other scheduled content), content on demand (e.g., video on demand (VOD) or other programs available on demand), recorded content (e.g., content recorded and/or otherwise stored on a local or network digital video recorder (DVR)), and other types of content. As will be appreciated by one of ordinary skill in the art, other devices may be considered noise sources. For example, a gaming system (e.g., SONY PLAYSTATION, MICROSOFT XBOX, etc.) playing a movie, running a game, and/or playing music may introduce noise.

The audio component of a movie playing on television 112 or another device may constitute background noise if the user is attempting to issue a voice command to a remote control device, such as a command to switch to a particular channel or play a particular program. The audio component of the movie may interfere with processing (e.g., understanding by a voice command processor) the user's voice command. If laptop 115 is playing music, the music may constitute background noise if the user is speaking on the user's mobile phone 116 with a friend. The background music may cause the user's voice to be more difficult to understand by the friend on the other side of the conversation. Other examples of noise sources include television shows, commercials, sports broadcasts, video games, or other content having audio components.

Noise sources need not be located at the user's home 102*a*. For example, the user may be streaming a television show from laptop 115 at a location different from the user's home (e.g., at a friend's house, outdoors, at a coffee shop, etc.). The user may also be holding a conversation on the user's mobile phone 116 near the laptop 115 streaming the television show. The audio component of the television show, if audible to a microphone on the mobile phone 116 or other computing device, may contribute noise to the user's telephone conversation.

Noise resulting from various content may have the same or similar frequency components as the audio signal. For example, if the noise source is a television sitcom, the frequency range of the sitcom may include the frequency range of human voice. If the audio signal is a voice command, the frequency range of the voice command may also include the frequency range of human voice.

The computing device may identify potential noise sources by comparing a list of devices at the user's home (or otherwise associated with the user) to a list of known noise sources. For example, the computing device may retrieve a list of known noise sources, such as a list including televisions, STBs, laptop computers, personal computers, appliances, etc. The list may be stored at, for example, a storage device within audio computing device 118, a storage device at local office 103, or at another local and/or network storage location. By comparing the user's devices with the list, the computing device may determine that the user's television 112, STB 113, personal computer 114, and laptop computer 115 are potential noise sources. On the other hand, the computing device may determine that mobile device 116 is not a potential noise source because mobile devices are not included on the list.

The computing device may also identify noise sources by determining which user devices receive content from local office 103 and/or other content provider. For example, the computing device may determine that TV 112, STB 113, and mobile device 116 are potential noise sources because they are configured to receive content from local office 103 or another content provider. TV 112 and/or STB 113 may be potential noise sources because they receive linear and/or on-demand content from the content provider or content stored on a DVR. Mobile device 116 may be a potential noise source because an application configured to display content from the content provider (e.g., a video player, music player, etc.) may be installed on the mobile device 116.

In some aspects, any device capable of accessing online content (e.g., on demand and/or streaming video, on demand and/or streaming music, etc.) from the content provider may be a potential noise source. These devices may include, for example, computers 114 and 115 or any other device capable of accessing online content. These devices may render the online content using a web browser application, an Internet media player application, etc. The computing device may identify these sources as potential noise sources based on whether a user is logged onto the user's account provided by the service provider, such as a provider of content and/or a provider of the noise removal service. Content delivered to these devices while the user is logged onto the account may be considered background noise. Potential noise sources may include devices that might, but not necessarily always, contribute noise. For example, television 112 may be capable of contributing noise (e.g., a television program), but might not actually contribute noise if the television is turned off, muted, etc. The computing device may store identifiers for the potential noise sources in the user's noise profile (e.g., an IP address, MAC address, other unique identifier, etc. for each noise source).

In step 410, the computing device may determine the location of each of the potential noise sources. This location may be the user's home 102*a*, such that all devices located in the user's home may be considered potential noise sources. Locations may also include more specific locations within the user's home 102*a*. For example, the user may have a first STB and/or television in the user's living room, a second STB and/or television in the user's bedroom, and a personal computer also in the user's bedroom. The user may provide the computing device with the locations of the noise sources. For example, the user might log onto an account provided by a service provider providing the noise removal service and input information identifying the various devices (e.g., by MAC address, IP address, or other identifier) and the location of each device (e.g., bedroom 1, living room, kitchen, etc.). The computing device may use the location of each potential noise source when identifying actual noise sources. For example, if the user conducts a telephone conversation in the user's bedroom, the second STB and/or television and the user's personal computer may be identified as actual noise sources because they are located in the user's bedroom. On the other hand, the first STB and/or television might not be identified as a noise source because the first STB and/or television are located in the living room, not the bedroom. The identified locations of the noise sources may be stored in the user's noise profile.

In step 415, the computing device may determine the expected noise contribution of each noise source, such as the expected magnitude of the noise picked up by various microphones at the user's home 102*a*. Magnitude of the noise may depend on various factors, such as the volume of the noise source (e.g., the volume of television 112). The magnitude of the noise may be high if the volume of the television is high and low if the volume of the television is low. Magnitude may also depend on acoustic attenuation of the noise source. For example, losses caused by the transmission of the content from the noise source (e.g., a television) to the microphone (e.g., located on a user's mobile device 116) may occur. In general, less attenuation may occur if a microphone is located in the same room (living room, bedroom, etc.) as the noise source than if the microphone is located in a different room from the noise source. The attenuation amount may also depend on the distance between the microphone and the noise source, even if the two devices are within the same room. For example, there may be less attenuation (and thus the noise may have a higher magnitude) if the microphone is five feet from a television 112 generating noise than if the microphone is fifteen feet from the television. Acoustical and/or corresponding electrical losses may also occur at the noise source and/or microphone (e.g., dependent on the gain, amplification, sensitivity, efficiency, etc.) of the noise source and/or the microphone.

The computing device may obtain estimates of the expected magnitude for potential noise sources. Each room within the user's home 102*a* may have an estimated attenuation and/or magnitude amount. For example, the user's living room may have an attenuation amount of A decibels, the bedroom may have an attenuation amount of less than A, and the kitchen may have an attenuation amount of more than A. The attenuation amounts may be a default amount set by a noise removal service provider and/or factor in various noise magnitude measurements or other estimates, either locally (e.g., for a particular user of the noise removal service) or globally (e.g., for all users of the noise removal service).

A profile for the noise magnitude may be generated by periodically collecting noise data (e.g., hourly, daily, weekly) or otherwise collecting the noise data (e.g., at irregular times, such as each time the user uses a microphone on a user device to issue a voice command or to make a call, each time content is detected as running in the background, etc.). The collected noise data may be used to make a local estimate of the magnitude of the noise. For example, a local noise profile may identify that the magnitude of the noise is reduced by 57% from a baseline magnitude at the user's home or within a particular room in the user's home. In some aspects, the baseline magnitude may be the default magnitude at which the content is delivered to the user from local office 103 (e.g., the magnitude level at which the content is broadcast to user devices). The computing device may use the 57% level (a delta or offset from the baseline of 100% level) to adjust the audio component of the piece of content (e.g., the noise signal) to remove from a received audio signal, as will be described in further detail in the examples below. The attenuation and/or magnitude amount for a particular user may be combined with other users of the noise cancellation service to generate a global noise profile. For example, the global noise profile may combine the estimate for a first user (e.g., 57% acoustical loss) with an estimate for a second user (e.g., 63% acoustical loss) to obtain a global estimate (e.g., 60% acoustical loss or other weighted average). Any number of users may be factored in to determine the global estimate.

A profile for the noise magnitude may also be generated during configuration of the noise removal service by the user. For example, after the user is signed up for the noise removal service, the user may be prompted to configure the user's device(s) for the service. FIGS. 7A-D illustrate example user interfaces for configuring a noise removal system according to one or more embodiments. A device 700, such as the user's mobile phone, may generate graphical user interfaces for configuring the noise removal service. The device may include a touch-screen display for the user to provide information for the noise removal service.

Figure 7A:
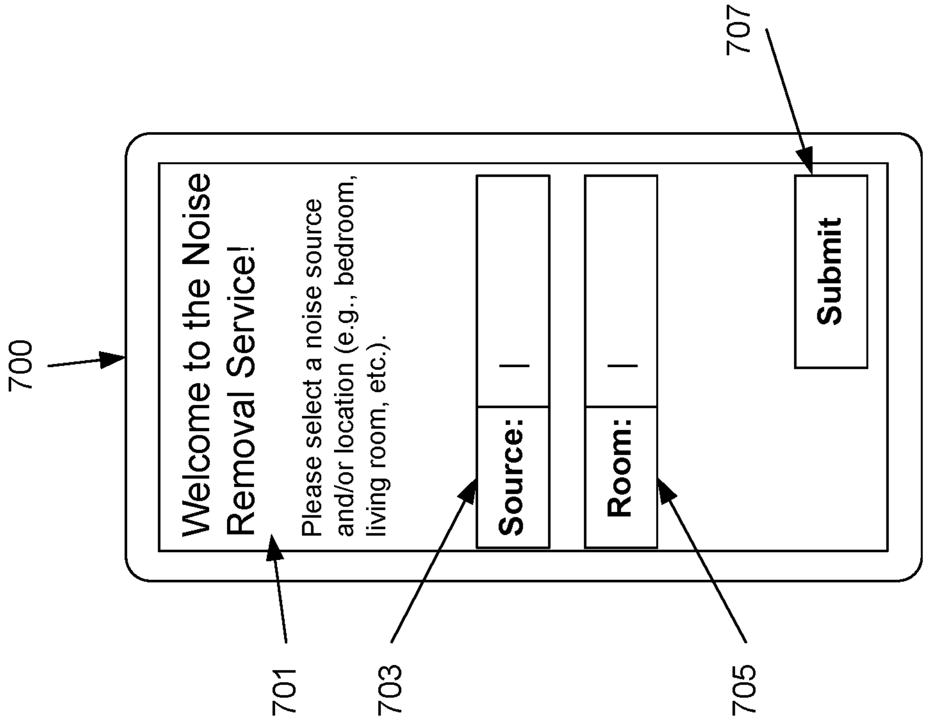
FIGS. 7A-D illustrate example user interfaces for configuring a noise removal system.

Referring to FIG. 7A, the interface may display a message 701 requesting the user to select a noise source and/or location of the noise source. The user may select and/or otherwise enter the noise source via selection box 703 and/or the location of the noise source via selection box 705. The user might not need to enter both the noise source information and noise source location information. For example, the location information may be automatically entered if the user enters the noise source information and the computing device knows the location of the noise source (e.g., as determined in step 410). When the user is finished entering the noise source and location information, the user may press the "Submit" button 707.

Figure 7B:
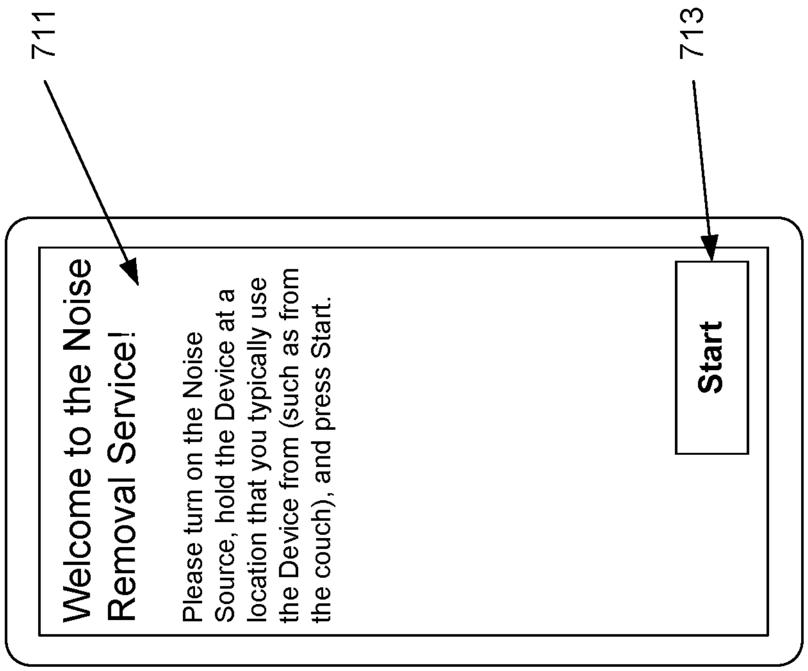
Figure 7D:
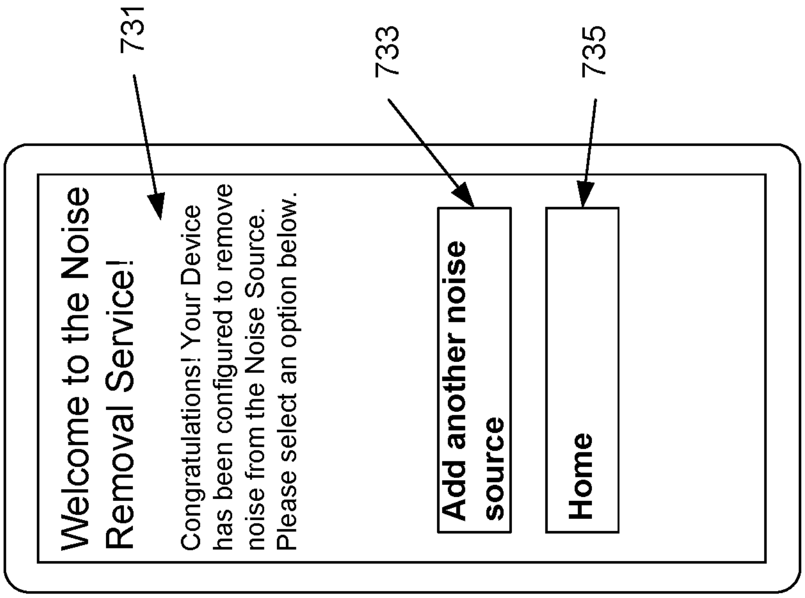

The device 700 may display another interface illustrated in FIG. 7B. The interface may include a message 711 providing instructions for configuring noise profiles for the noise source and/or a location. For example, the message 711 may instruct the user to turn on the noise source (e.g., a television) at a typical volume level and to place the device (e.g., the mobile phone) at a position in the room that the user typically uses the device from (e.g., to issue voice commands, make phone calls, etc.), such as the user's couch, kitchen counter, dining table, etc. The user may press the start button 713 to initiate noise cancellation configuration for the selected noise source or room.

Figure 7C:
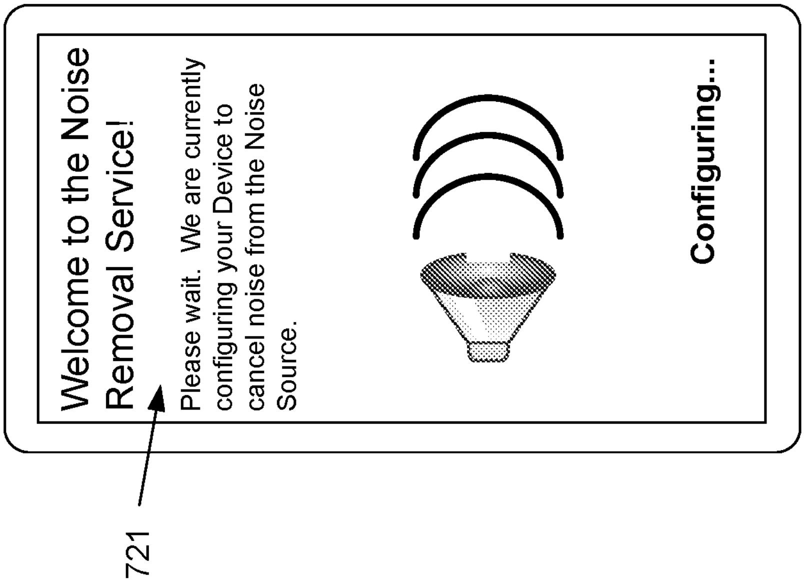

FIG. 7C illustrates an example interface having a message 721 that indicates that the user device (or audio computing device 118) is currently configuring the user device to cancel noise from the selected noise source and/or location. Once the noise source and/or location has been configured, the computing device may display the example interface illustrated in FIG. 7D. The interface may include a message 731 indicating that the user device has been configured to remove noise from the selected noise source and/or location and prompting the user to make another selection. For example, the user may press the "add another noise source button" 733 to configure another noise source and/or location. The user may also press the home button 735 to return to a screen of the noise removal service. The information collected during the noise source and/or location configuration process may be sent to the audio computing device 118 for the computing device to estimate the magnitude of each noise source and/or at each location. The magnitude (or attenuation) information may be stored in a noise profile (or factored into a noise profile, such as a global noise profile) to determine the appropriate magnitude of the audio component of a piece of content (the noise) to remove from a received audio signal, as will be described in further detail in the examples below.

Returning to FIG. 4, in step 420, the computing device may identify devices configured to transmit audio signals, which may have both desired signals and noise. The computing device may cancel the noise collected by these devices. These devices may be devices that the user uses to issue voice commands, make phone calls, etc. For example, the devices may include intelligent remote control devices (e.g., remote controls that are configured to receive and/or process voice commands), mobile phones (e.g., smartphones), and other devices that transmit audio signals.

Figure 5A:
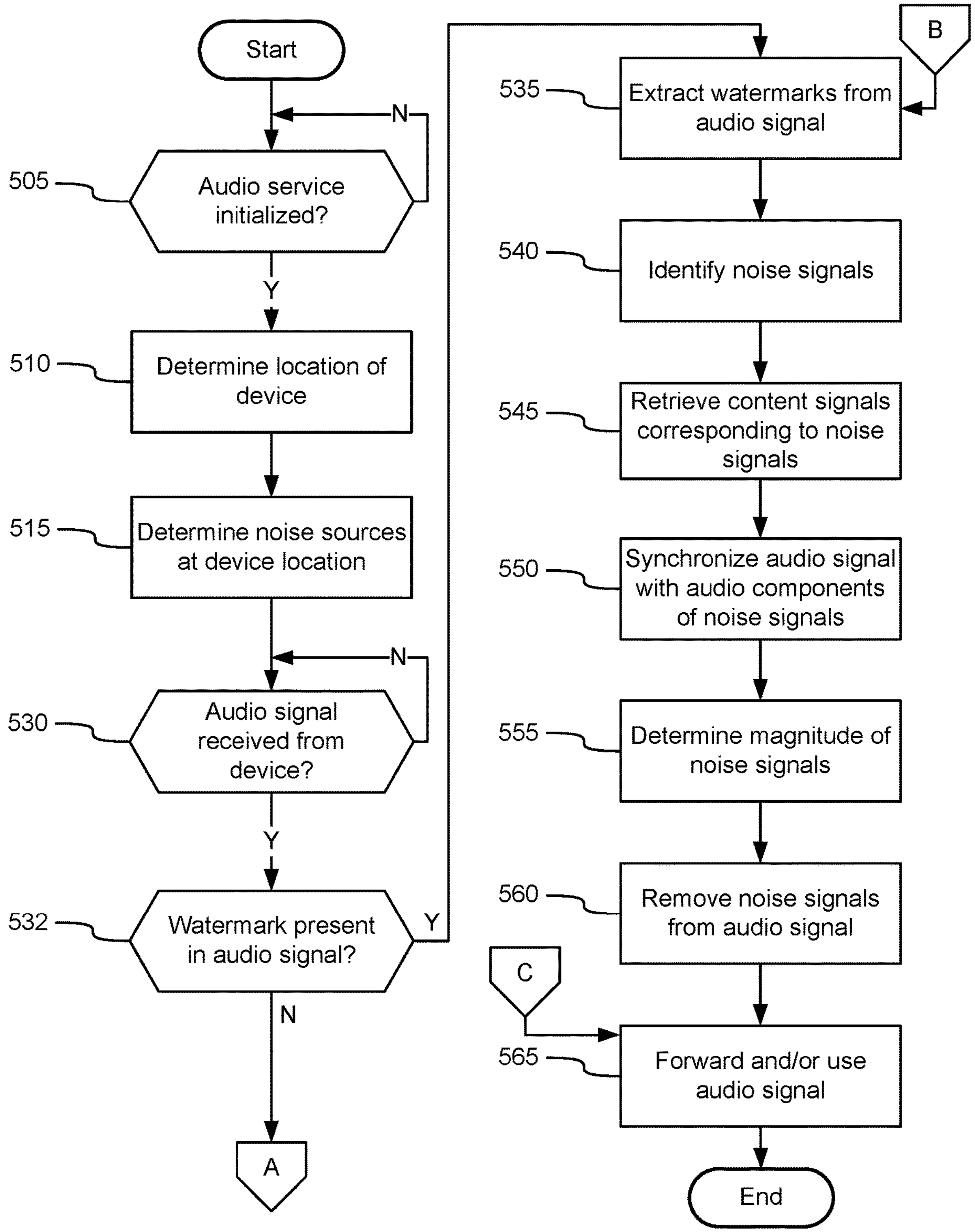
FIG. 5A illustrates an example method of removing noise from an audio signal.

FIG. 5A illustrates an example method of removing noise from an audio signal according to one or more illustrative aspects of the disclosure. The steps illustrated may be performed by a computing device, such as audio computing device 118 illustrated in FIG. 1. In step 505, the computing device may determine whether an audio service has been initialized. Audio services may include hardware and/or software components on the user's device that provide various voice services to the user. For example, the audio service may facilitate phone calls over various networks (e.g., cellular networks, such as 3G and 4G networks, public switched telephone networks, the internet, such as in a Voice over IP call, and/or combinations thereof). The audio service may also facilitate receiving and/or processing voice commands, such as a voice command to change a channel on a television and/or STB or a voice command to perform a local search (e.g., to search the user's device for information, such as the user's mobile phone for contacts) or a network search (e.g., a keyword search over the Internet using a voice recognition search tool). Voice command software may include dictation software (e.g., software configured to recognize speech and/or to convert the speech to characters on a digital document) and other speech recognition programs. The computing device may determine that an audio service has been initialized if the user, for example, dials a destination telephone number (or a portion of the number), starts an application (e.g., a mobile dictation app), and/or otherwise issues a voice command to the user's device.

In step 510, the computing device may determine the location of the device having the audio service (e.g., the user's mobile phone). If the user is in the user's home 102*a*, the relevant location may be the user's home or a particular room in the home (e.g., bedroom 1, kitchen, living room, etc.). The user may provide the computing device with the location of the user device. For example, the user device may display various graphical user interfaces (similar to the example interfaces of FIG. 7) requesting input from the user of the user's current location. The user may select the appropriate location (e.g., a room in home 102*a*, such as the living room). The computing device may additionally (or alternatively) determine the location of the user device based on automatic position tracking (e.g., via a global positioning system (GPS), by identifying the IP address of the user device, by analyzing various network access points, such as Wi-Fi access points, near and/or utilized by the user device, other geolocation systems, etc.). Additionally or alternatively, the computing device may determine the user's location based on which noise source(s) the user (or user device) is interacting with or has interacted with. For example, the computing device may determine that the most recent command issued by the user was through the STB 113. In this example, the computing device may determine that the user is located at the location of the STB 113 (e.g., the living room if that is where STB 113 is located).

Figure 5B:
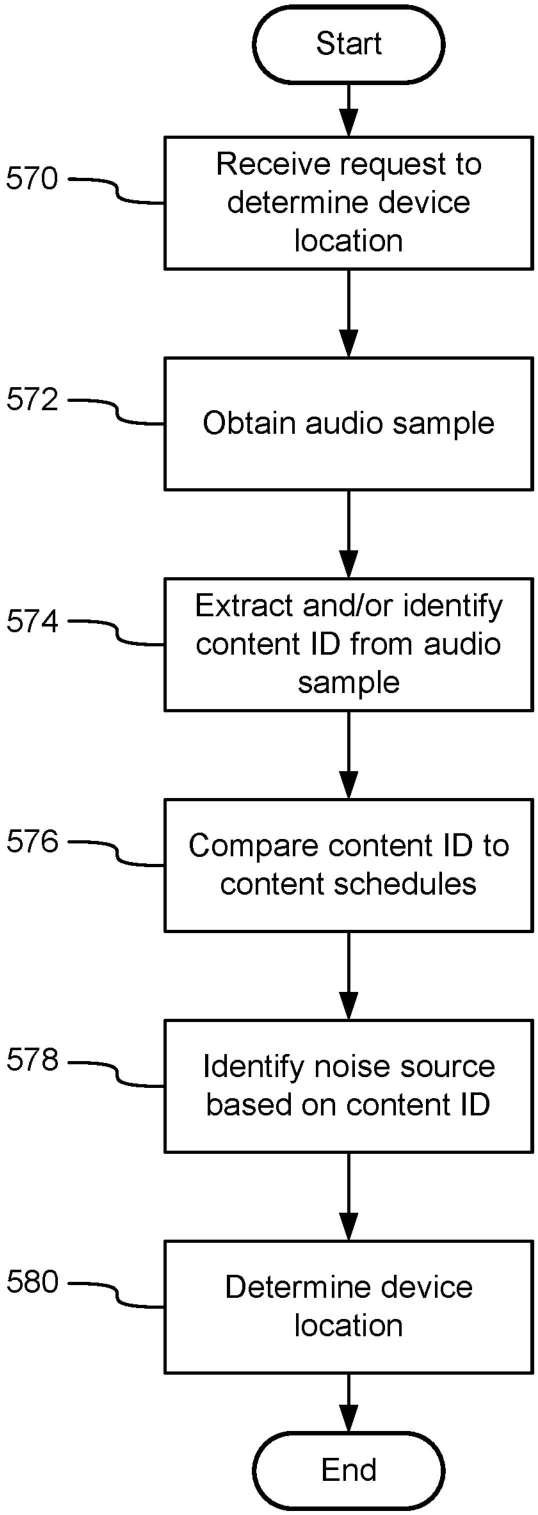
FIG. 5B illustrates an example method of determining the location of a device.
Figure 8A:
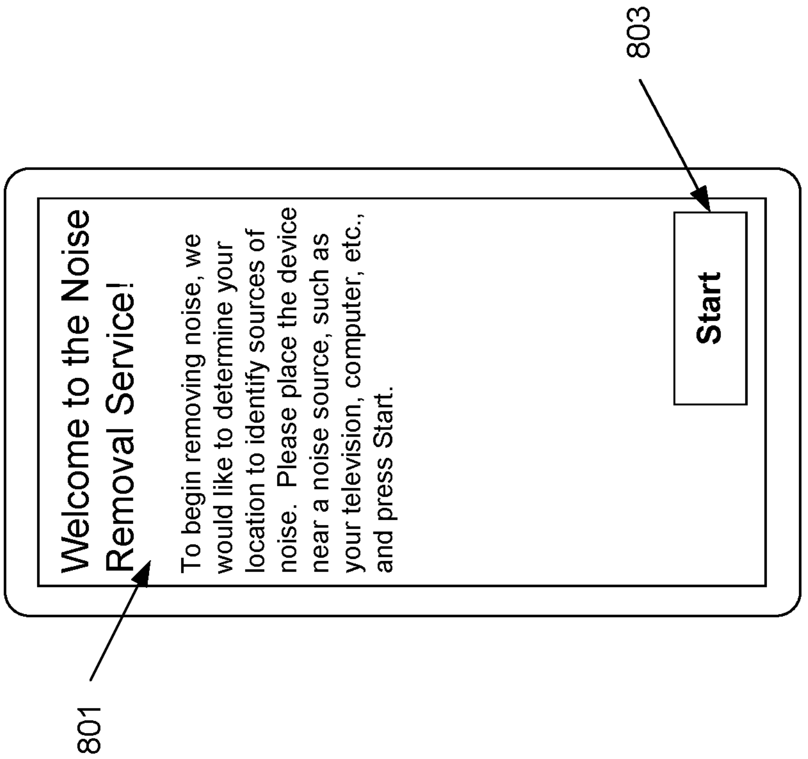
FIGS. 8A-B illustrate example user interfaces for determining the location of a user device.
Figure 8B:
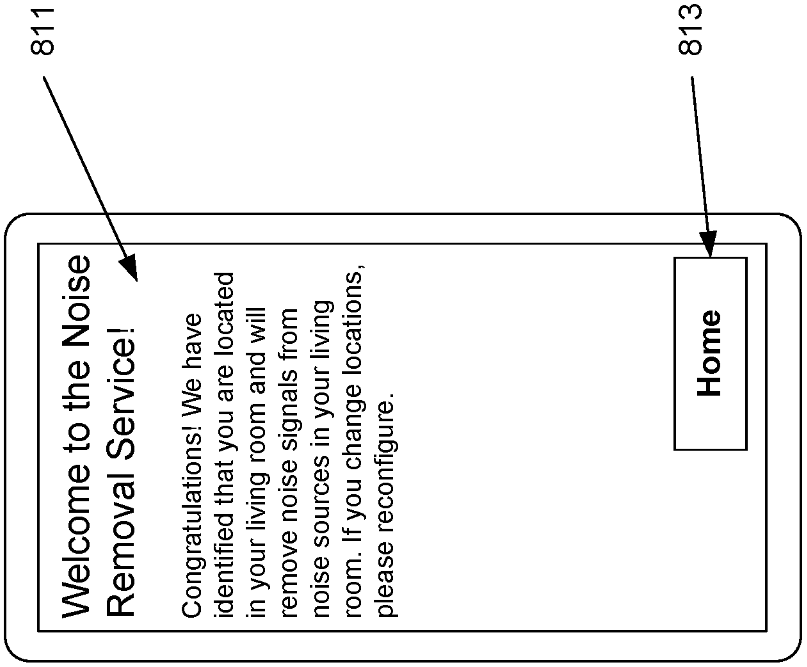

The computing device may also determine the location of the user device by taking an audio sample (e.g., a noise sample) using the user device's microphone. FIG. 5B illustrates an example method of determining the location of a device according to one or more illustrative aspects of the disclosure. FIGS. 8A-B illustrate example user interfaces for determining the location of a user device according to one or more embodiments.

In step 570, the computing device may receive a request to determine the location of the user device. For example, as illustrated in FIG. 8A, the user device may display a message 801 indicating that the user's location may need to be determined in order to identify noise sources that may contribute noise signals to the user device. The message 801 may optionally request that the user hold the user device near a noise source, such as the user's television 112, computer 114, etc. and press a start button 803 when the device is near the noise source.

In step 572, the computing device may obtain an audio sample when the user presses the start button. The user device may record an audio sample (e.g., a two second sample, a five second sample), and the recorded audio sample may be forwarded to the computing device (which, as previously described, might or might not be within the user device). The computing device may use the audio sample to determine the location of the user device, as will be described in further detail in the examples below. In some aspects, the computing device may determine the location of the user device based on audio watermarks encoded in noise signals. Thus, when the microphone records the noise signals, it may also record the audio watermarks.

Audio watermarks (e.g., audio signals substantially imperceptible to human hearing) may be encoded in an audio component of a piece of content. The audio watermarks may be included in the content at predetermined time intervals (e.g., every second, every two seconds, every four seconds, etc.). Each audio watermark may include various types of information. The audio watermark may encode a timestamp (or date stamp) of the audio watermark relative to a baseline time. For example, an audio watermark may be located 23 minutes into a television program. If the baseline time is the start time of television program (e.g., baseline is 0 minutes), the timestamp of the audio watermark may be 23 minutes. The timestamp may also indicate an absolute time. For example, if the current time is 6:12 PM, the timestamp may indicate a timestamp of 6:12 PM. The timestamp may include an absolute time if, for example, the timestamp is included in the audio component of a linear content (or other content scheduled to play at a particular time).

In some aspects, the audio watermark may also identify the piece of content having the audio watermark. For example, a unique identifier, such as a program identifier (PID) may be included in the audio watermark. Other globally unique identifiers may be used (e.g., identifiers unique to the piece of content that distinguish the piece of content from other pieces of content). An identifier for the source of the content (e.g., a content provider) may also be included in the audio watermark. In some aspects, audio watermarks may be NIELSEN watermarks or other types of audio fingerprints.

In step 574, the computing device may extract one or more audio watermarks from the recorded audio sample to identify the corresponding piece of content. For example, the computing device may identify the piece of content based on the unique identifier of the piece of content encoded in the audio watermark. In step 576, the computing device may compare the unique identifier to content played by various devices at the user's home 102*a* to identify the noise source that generated the noise. For example, if the noise sample was collected at 5:05 PM and the identifier extracted from the audio watermark indicated TV Show 1, the computing device may search various content schedules for any instances of TV Show 1 scheduled to play at or before 5:05 PM (e.g., linear content scheduled to play at or before 5:05 PM or on demand content requested to play at or before 5:05 PM). The content schedule may correspond to a television program listing, such as a listing included in a television program guide. The content schedule may also correspond to a listing of content stored by the user (e.g., in a local or network DVR). The computing device may retrieve the content schedules from one or more devices at the home 102*a* (e.g., a STB 113 that stores the schedule) or a network storage location (e.g., from a content provider, from local office 103, etc.).

When a match for TV Show 1 is made, the computing device, in step 578, may identify the corresponding noise source scheduled to play TV Show 1 (e.g., Television 1). For example, if TV Show 1 is listed in a content schedule stored on STB 113 that provides content to Television 1, the computing device may identify Television 1 as the noise source. In step 580, the computing device may determine the location of the user device by finding the identified noise source in the user's noise profile and its associated location (e.g., as determined and/or stored in step 410). For example, the computing device may determine that Television 1 is located in the user's living room and thus determine that the user device is also currently located in the user's living room. The computing device may also determine the location of the user device without requiring the user to press the "Start" button 803 (e.g., as illustrated in FIG. 8A). For example, a noise sample may be automatically collected in response to the user initiating the audio service (e.g., in step 505) or at periodic intervals (e.g., every 15 minutes) to keep the user's location updated. When the location of the user device has been identified, the example user interface illustrated in FIG. 8B may be presented to the user. The interface may include a message 811 indicating that the device location has been identified. The interface may also include a home button 813 that brings the user back to a home interface, such as the interface illustrated in FIG. 8A.

Returning to FIG. 5A, in step 515, the computing device may determine the noise sources at the location of the user device. The computing device may compare the determined location of the user device to locations of noise sources previously stored by the computing device in step 410 (e.g., in the user's noise profile). For example, the computing device may determine that a first STB and/or television, a laptop computer, and a tablet computer (all potential sources of noise) are located in the same room as the user device (e.g., the living room).

In step 530, the computing device may determine whether an audio signal has been received from the user device (e.g., a remote control, mobile phone, etc.). For example, during a phone call, the computing device may receive an audio signal including a user's voice signal. As will be described in further detail in the examples below, the computing device may process the audio signal (e.g., by removing noise), and forward the audio signal to a phone call recipient (or an intermediate node between the computing device and the phone call recipient). Similarly, if the audio signal includes a voice command, the computing device may process the voice command signal (e.g., by removing noise), and forward the voice command signal to a voice command processor (e.g., a processor configured to identify the voice command and perform an action, such as switching channels on a television, in response to the voice command).

The computing device may wait, in step 530, to receive an audio signal. When the computing device receives an audio signal (step 530: Y), the computing device may process the received audio signal. In step 532, the computing device may determine whether an audio watermark is present in the audio signal. If the computing device does not detect an audio watermark (step 532: N), the computing device may perform additional steps as illustrated in FIG. 5C.

Figure 5C:
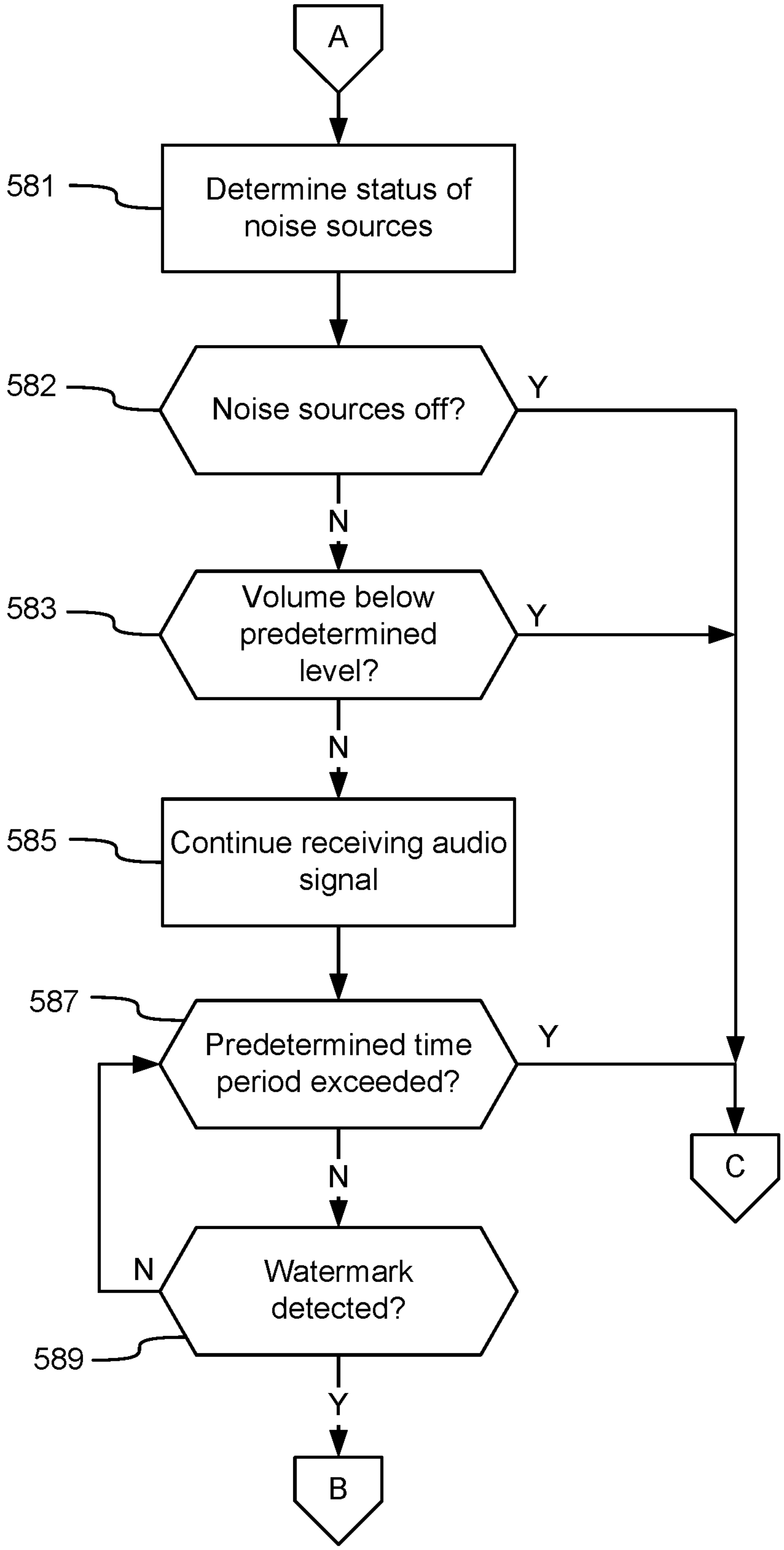
FIG. 5C illustrates an example method of detecting an audio watermark.

FIG. 5C illustrates an example method of detecting an audio watermark according to one or more illustrative aspects of the disclosure. An audio watermark may indicate the presence or absence of various noise signals. Alternatively (or additionally), the presence or absence of noise signals may be determined based on the status of noise sources producing the noise signals. In step 581, the computing device may determine the status of these noise sources. For example, the computing device may receive, from the user home 102*a* (e.g., via modem 110 and/or gateway 111, via the user's device, such as a mobile phone, etc.) indications of the status of various noise sources located at the user's home 102*a* (e.g., television 112, STB 113, personal computer 114, laptop computer 115, wireless device 116, etc.). Example statuses include, but are not limited to, on (e.g., playing, streaming, etc.) and off (e.g., stopped, paused, muted, etc.). For example, the STB 113 may be paused. If STB 113 is paused (or otherwise off), the computing device may determine that STB is not contributing noise signals. The computing device may perform similar determinations for other noise sources at the user's location.

In step 582, the computing device may determine whether the noise sources are off. If the noise sources are off (step 582: Y), the computing device may determine that the noise sources are not contributing noise signals. The computing device may take path C and forward the audio signal to the next destination (e.g., in step 565) without performing noise removal, as will be discussed in further detail in the examples below. In step 583, the computing device may determine whether the volume of the noise sources fall below a predetermined level (e.g., a volume level that might not require removal of noise signals, such as 10% of the maximum volume for the noise source) if the noise sources are not off (step 582: N). Each noise source may have its own predetermined level. If the volume levels of the noise sources are below the one or more predetermined volume levels (step 583: Y), the computing device may determine that the noise sources are not contributing noise signals (or are contributing an imperceptible amount of noise). The computing device may take path C and forward the audio signal to the next destination (e.g., in step 565) without performing noise removal. If the volume levels of the noise sources are not below the one or more predetermined levels (step 583: N), the computing device may attempt to detect watermarks in the received audio signal.

In step 585, the computing device may continue to receive the audio signal received in step 530. For example, the computing device may transmit a command to the user device to continue receiving (e.g., recording) the audio signal. The user device may respond to the command by keeping the microphone used to receive the audio signal active (e.g., in an audio signal capture mode).

In step 587, the computing device may determine whether a predetermined time period has been exceeded. In some aspects, the computing device may extend the length of the captured audio signal by the predetermined time period. For example, if the audio signal captured in step 530 is two seconds in length and the predetermined time period is one second in length, the computing device may extend the captured audio signal to three seconds. The predetermined time period may be an arbitrary length of time, such as one second. The predetermined time period may also depend on the timing/frequency of the audio watermarks. The length of the recorded audio signal may be extended to guarantee detection of at least one watermark, if a watermark is present. For example, if watermarks are present in the noise signal every four seconds and a two second audio signal is captured in step 530, the computing device may set the predetermined time period to two seconds so that the total length of the captured audio signal is four seconds. The computing device may set the length of the captured audio signal (by adjusting the predetermined time period) to capture any number of audio watermarks (e.g., 8 seconds for two watermarks, 12 seconds for three watermarks, etc.).

In step 589, the computing device may determine whether a watermark has been detected if the time period has not yet passed (step 587: N). If a watermark has been detected (step 589: Y), the computing device may take path B in order to perform noise removal, as will be described in further detail in the examples below. If a watermark has not been detected (step 589: N), the computing device may return to step 587 to determine if the predetermined time period has been exceeded. If the predetermined time period has been exceeded (step 587: Y), the computing device may take path C and forward the audio signal to the next destination (e.g., in step 565) without performing noise removal.

Returning to FIG. 5A, in step 535, the computing device may extract one or more audio watermarks from the received audio signal. The user's device used to issue the voice command or conduct the phone call (e.g., a mobile phone or remote control) may pick up audio components of Television Show 1 and Song 1 in addition to the voice command/phone call conversation. Thus, the audio signal may include, among other signals, an audio component of Television Show 1, and audio component of Song 1, and an audio component of the user's voice command/phone call conversation. Thus, in step 535, the computing device may extract one or more watermarks contributed by the audio component of Television Show 1 and/or the audio component of Song 1.

In step 540, the computing device may identify the noise signals present in the received audio signal. In some aspects, the computing device may request information identifying content previously played by one or more noise sources at the home 102*a*. The computing device may request the information from each user device in the home 102*a* configured to play content (e.g., TV 112, STB 113, PC 114, laptop 115, and/or mobile device 116), an interface device that forwards content from content sources (e.g., local office 103) to the user devices (e.g., modem 110, gateway 111, DVR, etc.), and/or any other device at the home 102*a* that stores this information. The computing device may similarly request the information from a device located at the local office 103, a central office, and/or any other device that stores information on content delivered to devices at the home 102*a*. In some aspects, the computing device may request information on content played by a subset of user devices. For example, the computing device might only request information for devices located at the same location as the user's remote control and/or phone (as determined, for example, in step 515).

The computing device may request information on content played within a predetermined time period. The time period may correspond to the length of time of the received audio signal (voice command). For example, if a two second voice command is received, the computing device may request information on content played during the two second time period of the voice command. The time period may be any predetermined length of time. For example, the computing device may request information identifying content played in the last five seconds since receiving the audio signal. The computing device may also extract noise signal identifiers (e.g., program identifiers) from the audio watermarks present in the received audio signal (e.g., a unique identifier for TV Show 1, such as TVSHOW1).

In step 545, the computing device may identify and/or receive various pieces of content corresponding to the noise signals identified in step 540. For example, the computing device may identify content provided to the user while the audio signal having noise was generated (e.g., created by noise sources and/or received by the user device, such as at the microphone). Receiving the pieces of content may include receiving a portion of the audio component of the content (e.g., a fraction of the audio component of a television program, such as the last ten seconds of the program), the entire audio component of the content (e.g., an entire forty minutes of the audio component if the television program is forty minutes long), the entire content (e.g., the entire audio component of the content, the entire video component of the content, and other data related to the content, such as timestamps, content identifiers, etc.), or any combination thereof (e.g., five minutes of the video component and forty minutes of the audio component of a piece of content).

The computing device may receive the audio component of content from various sources, such as a local office 103, a central office, a content provider, networked storage (e.g., cloud storage), and or any other common storage location. For example, the computing device may receive the audio component of content from a network DVR utilized by the user to store recorded content or content server 106 providing the content to the user. Additionally (or alternatively), the computing device may receive the audio component of content from devices at the user's home 102*a*. The computing device may receive the audio component of content from the television 112, STB 113, a local DVR, and/or any other device that stores (permanently or temporarily) the content. For example, if the STB buffers, caches, and/or temporarily stores the content, the computing device may retrieve the audio component of the content from the STB. In addition to receiving the audio component of content, the computing device may receive status information on the noise sources. As previously described, status information may include whether a noise source is on or off and/or the volume of the noise source during the time frame of the audio signal (voice command). As will be described in further detail in the examples below (e.g., with respect to step 555), the computing device may use the status information to determine the magnitude (e.g., contribution) of the noise source.

Figure 6:
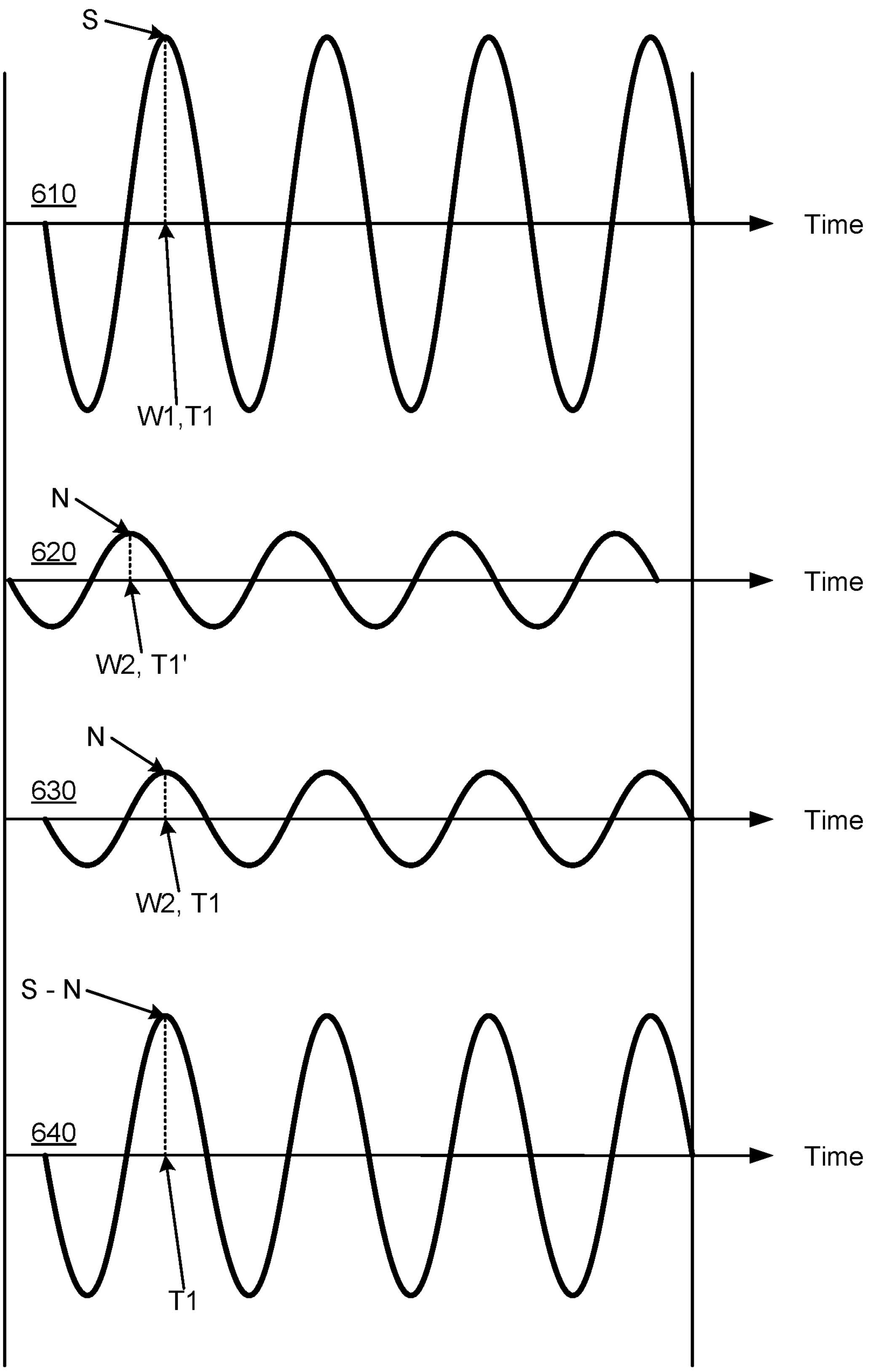
FIG. 6 illustrates removing noise from an audio signal.

In step 550, the computing device may synchronize the audio signal having one or more noise signals included therein with one or more corresponding audio components of content (e.g., the content signals). The computing device may compare one or more watermarks included in the received audio signal (having both a desired signal, such as a voice command, and an undesired signal, such as a noise signal caused by a noise source) with one or more watermarks included in the audio components of content. FIG. 6 illustrates an example of removing noise from an audio signal according to one or more illustrative aspects of the disclosure. Signal 610 may represent a received audio signal having both desired and undesired signals and may have a watermark W1 having a timestamp indicating time T1. Signal 620 may represent a stored audio component of a piece of content corresponding to the noise signal in the audio signal 610. Signal 620 may have a watermark W2 having a timestamp indicating time T1'. By matching watermark W1 with watermark W2, the computing device may synchronize noise signal 620 with audio signal 610, as illustrated by synchronized noise signal 630. Synchronization may remove network and/or playback induced time differences between the audio signal collected at the user device and the audio component of content collected from the content source.

In some aspects, the computing device may synchronize the noise signal 620 and the audio signal 610 without using watermarks. For example, the computing device may compute the cross-correlation between the noise signal 620 and the audio signal 610. The noise signal 620 may be synchronized with the audio signal 610 at the point in time of the maximum of the cross-correlation function. The cross-correlation method may be more useful if the magnitude of the noise component of the audio signal 610 (e.g., a background television program) is large relative to the desired component of the audio signal 610 (e.g., the voice command). Accordingly, the computing device may determine whether to use cross-correlation or watermarks to synchronize the audio signal 610 (having the noise and desired components) and the noise signal 620 based on the magnitude of the noise component relative to the magnitude of the desired component. For example, if the magnitude of the noise component is three times greater than the magnitude of the desired component, the computing device may select the cross-correlation synchronization method. On the other hand, if the magnitude of the noise component is less than three times the magnitude of the desired component, the computing device may synchronize based on watermarks. Three times the magnitude is merely exemplary and any threshold may be used in deciding between synchronization methods.

Returning to FIG. 5A, in step 555, the computing device may determine the magnitude of the noise signals present in the audio signal. Expected magnitudes for various noise signals may have been previously stored in the user's noise profile during configuration (e.g., in step 415). Alternatively, the computing device may determine the magnitude of noise signals based on status information received with the content signals in step 545. The magnitude of the audio component 630 corresponding to the noise signal in the audio signal may be adjusted based on the expected and/or actual magnitude of the noise signal. For example, the audio component 630 may be multiplied by a gain, such as ½ if the magnitude of the noise signal is half of the magnitude of the corresponding audio component, 1 if the magnitude of the noise signal matches the magnitude of the corresponding audio component, and 2 if the magnitude of the noise signal is twice the magnitude of the corresponding audio component.

In step 560, the computing device may remove noise signals from the audio signal, such as by subtracting the synchronized and/or magnitude-adjusted audio component 630 from audio signal 610. Signal 640 represents a resulting audio signal having the audio component of a noise signal 630 removed from the received audio signal 610. As will be appreciated by one of ordinary skill in the art, other ways of subtracting signals, adding signals, performing mathematical functions on signals, correlating signals (e.g., Fast Fourier Transform), etc. to produce the resulting signal in step 560 may be performed.

In some aspects, the computing device might not adjust the magnitude of the audio component 630 before subtracting component 630 from the audio signal 610 (e.g., step 555 may be optional). Instead, the computing device may subtract the synchronized audio component 630 (without adjusting the magnitude of the audio component 630) from the audio signal 610 in step 560. The audio component 630 initially subtracted from the audio signal 610 may have a baseline magnitude (e.g., the magnitude of the content delivered to the user, as previously discussed). The computing device may then determine whether the signal-to-noise ratio (SNR) of the noise-removed audio signal is above a predetermined SNR threshold (e.g., an SNR that permits a voice command processor to identify the user command). If the SNR is not above the predetermined threshold, the computing device may adjust the magnitude of audio component 630 and subtract the new magnitude-adjusted audio component from the received audio signal 610. The computing device may determine the SNR of the resulting signal. The computing device may continue to adjust the magnitude of the audio component 630 and subtract the component from the audio signal 610 until the resulting noise-removed signal has reached the predetermined SNR or has reached an optimal SNR (e.g., the maximum SNR).

In step 565, the computing device may use and/or otherwise forward the noise-removed audio signal to the next destination. For example, if the audio signal is a voice command, the computing device may forward the audio signal to a voice command processor configured to process the voice command, such as to determine an action to take in response to the command (e.g., switch channels, play a requested program, etc.). Alternatively, if the computing device includes voice command services, the computing device may process the noise-removed audio signal itself to identify and act on the voice command. If the audio signal is part of a phone conversation, the computing device may forward the audio signal to a phone call recipient (or an intermediate node).

The various features described above are merely non-limiting examples, and can be rearranged, combined, subdivided, omitted, and/or altered in any desired manner. For example, features of the computing device described herein (which may be server 106 and/or audio computing device 118) can be subdivided among multiple processors and computing devices. The true scope of this patent should only be defined by the claims that follow.

The invention claimed is:

1. A non-transitory computer-readable medium storing instructions that, when executed, configure a device to:

determine first data comprising audio captured via a microphone;

determine, based on the audio, a location associated with the device;

determine, based on the location, noise;

remove the noise from the audio; and send, via a network, second data comprising the audio with the noise removed.

2. The non-transitory computer-readable medium of claim 1, wherein the instructions, when executed, configure the device to determine, based on the audio, the location associated with the device, by at least:

determining, based on the audio, a piece of content comprising an audio component and a video component; and determining, based on the audio component of the piece of content, the location.

3. The non-transitory computer-readable medium of claim 1, wherein the instructions, when executed, configure the device to determine the noise based on the location associated with the device, by at least:

determining the noise based on a piece of content associated with the location.

4. The non-transitory computer-readable medium of claim 1, wherein the instructions, when executed, configure the device to determine the noise based on the location associated with the device, by at least:

determining, based on a time schedule of a plurality of pieces of content, a piece of content associated with the location; and determining the noise based on the piece of content.

5. The non-transitory computer-readable medium of claim 1, wherein the instructions, when executed, configure the device to determine, based on the audio, the location associated with the device, by at least:

determining, based on the audio, an audio watermark;

determining, based on the audio watermark, a piece of content; and determining, based on the piece of content, the location.

6. The non-transitory computer-readable medium of claim 1, wherein the second data is part of a voice call between the device and another device.

7. The non-transitory computer-readable medium of claim 1, wherein the instructions, when executed, configure the device to:

generate, based on the noise, a noise signal that is synchronized with the audio; and subtract the noise signal from the audio.

8. A system comprising:

a first device comprising a microphone; and a second device configured to emit sound, wherein the first device is configured to:

determine first data comprising audio captured via the microphone, wherein the audio is based on the sound emitted by the second device and based on other sound;

determine, based on the audio, a location associated with the first device;

determine, based on the location, noise associated with the second device;

remove the noise from the audio; and send, via a network, second data comprising the audio with the noise removed.

9. The system of claim 8, wherein the first device is configured to determine, based on the audio, the location associated with the first device, by at least:

determining, based on the audio, a piece of content comprising an audio component and a video component; and determining, based on the audio component of the piece of content, the second device; and determining, based on the second device, the location.

10. The system of claim 8, wherein the first device is configured to determine the noise based on the location associated with the first device, by at least:

determining the noise based on a piece of content associated with the second device, wherein the second device is associated with the location.

11. The system of claim 8, wherein the first device is configured to determine the noise based on the location associated with the first device, by at least:

determining, based on a time schedule of a plurality of pieces of content, a piece of content associated with the second device, wherein the second device is associated with the location; and determining the noise based on the piece of content.

12. The system of claim 8, wherein the first device is configured to determine, based on the audio, the location associated with the first device, by at least:

determining, based on the audio, an audio watermark;

determining, based on the audio watermark, a piece of content; and determining, based on the piece of content, the location.

13. The system of claim 8, wherein the second data is part of a voice call between the first device and a third device.

14. The system of claim 8, wherein the first device is configured to:

generate, based on the noise, a noise signal that is synchronized with the audio; and subtract the noise signal from the audio.

15. A non-transitory computer-readable medium storing instructions that, when executed, configure a device to:

determine first audio captured via a microphone, wherein the first audio comprises a voice command;

determine, based on the first audio, a location associated with the device;

determine, based on the location, noise;

remove the noise from the first audio to produce second audio that comprises a reduced-noise version of the voice command; and send, via a network, the second audio.

16. The non-transitory computer-readable medium of claim 15, wherein the instructions, when executed, configure the device to determine, based on the first audio, the location associated with the device, by at least:

determining, based on the first audio, content comprising an audio component and a video component; and determining, based on the audio component of the content, the location.

17. The non-transitory computer-readable medium of claim 15, wherein the instructions, when executed, configure the device to determine the noise based on the location associated with the device, by at least:

determining the noise based on content associated with the location.

18. The non-transitory computer-readable medium of claim 15, wherein the instructions, when executed, configure the device to determine the noise based on the location associated with the device, by at least:

determining, based on a content time schedule, content associated with the location; and determining the noise based on the content.

19. The non-transitory computer-readable medium of claim 15, wherein the instructions, when executed, configure the device to determine, based on the first audio, the location associated with the device, by at least:

determining, based on the first audio, an audio watermark;
determining, based on the audio watermark, content; and
determining, based on the content, the location.

20. The non-transitory computer-readable medium of claim 15, wherein the location comprises a location of another device that is generating the noise.

21. The non-transitory computer-readable medium of claim 15, wherein the second audio comprises an improved signal-to-noise ratio for the voice command as compared with the first audio.

22. The non-transitory computer-readable medium of claim 15, wherein the instructions, when executed, configure the device to:

generate, based on the noise, a noise signal that is synchronized with the audio; and
subtract the noise signal from the audio.

23. A system comprising:

a first device comprising a microphone; and
a second device configured to emit sound, wherein the first device is configured to:
determine first audio captured via the microphone, wherein the first audio comprises a voice command and is based on the sound emitted by the second device;
determine, based on the first audio, a location associated with the first device;
determine, based on the location, noise associated with the second device;
remove the noise from the first audio to produce second audio that comprises a reduced-noise version of the voice command; and
send, via a network, the second audio.

24. The system of claim 23, wherein the first device is configured to determine, based on the first audio, the location associated with the first device, by at least:

determining, based on the first audio, content comprising an audio component and a video component; and
determining, based on the audio component of the content, the location.

25. The system of claim 23, wherein the first device is configured to determine the noise based on the location associated with the first device, by at least:

determining the noise based on content associated with the location.

26. The system of claim 23, wherein the first device is configured to determine the noise based on the location associated with the first device, by at least:

determining, based on a content time schedule, content associated with the location; and
determining the noise based on the content.

27. The system of claim 23, wherein the first device is configured to determine, based on the first audio, the location associated with the first device, by at least:

determining, based on the first audio, an audio watermark;
determining, based on the audio watermark, content; and
determining, based on the content, the location.

28. The system of claim 23, wherein the location comprises a location of another device that is generating the noise.

29. The system of claim 23, wherein the second audio comprises an improved signal-to-noise ratio for the voice command as compared with the first audio.

30. The system of claim 23, wherein the first device is configured to:

generate, based on the noise, a noise signal that is synchronized with the audio; and
subtract the noise signal from the audio.

31. A non-transitory computer-readable medium storing instructions that, when executed, configure a device to:

determine first audio captured via a microphone of a device, wherein the first audio comprises a voice command;
determine, based on the first audio and a content time schedule, content being presented by a noise source;
determine noise based on the content;
remove the noise from the first audio to produce second audio that comprises a reduced-noise version of the voice command; and
send, via a network, the second audio.

32. The non-transitory computer-readable medium of claim 31, wherein the content comprises an audio component and a video component, and wherein the instructions, when executed, configure the device to determine the noise based on the content by at least:

determining the noise based on the audio component.

33. The non-transitory computer-readable medium of claim 31, wherein the instructions, when executed, further configure the device to:

determine, based on the first audio, an audio watermark, wherein the determining the content is further based on the audio watermark; and
determine, based on the content, the noise source.

34. The non-transitory computer-readable medium of claim 31, wherein the noise source comprises another device that is presenting content associated with the noise.

35. The non-transitory computer-readable medium of claim 31, wherein the instructions, when executed, configure the device to:

generate, based on the noise, a noise signal that is synchronized with the first audio; and
subtract the noise signal from the first audio.

36. A system comprising:

a first device comprising a microphone; and
a second device configured to emit sound,
wherein the first device is configured to:
determine first audio captured via the microphone, wherein the first audio comprises a voice command and is based on the sound emitted by the second device;
determine, based on the first audio and a content time schedule, content being presented by the second device;
determine noise based on the content;
remove the noise from the first audio to produce second audio that comprises a reduced-noise version of the voice command; and
send, via a network, the second audio.

37. The system of claim 36, wherein the content comprises an audio component and a video component, and wherein the first device is configured to determine the noise based on the content by at least:

determining the noise based on the audio component.

38. The system of claim 36, wherein the first device is further configured to:

determine, based on the first audio, an audio watermark;
determine the content further based on the audio watermark; and
determine, based on the content, the second device.

39. The system of claim 36, wherein the first device is configured to:

generate, based on the noise, a noise signal that is synchronized with the first audio; and subtract the noise signal from the first audio.

* * * * *